(12) United States Patent
Saugrain et al.

(10) Patent No.: US 9,748,758 B2
(45) Date of Patent: Aug. 29, 2017

(54) DEVICE COMPRISING A SPACE CHARGE TRAPPING LAYER

(71) Applicant: NEXANS, Paris (FR)

(72) Inventors: Jean-Maxime Saugrain, Le Vesinet (FR); Pierre Mirebeau, Villebon sur Yvette (FR)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/401,208

(22) PCT Filed: Jun. 7, 2013

(86) PCT No.: PCT/FR2013/051328
§ 371 (c)(1),
(2) Date: Nov. 14, 2014

(87) PCT Pub. No.: WO2013/182829
PCT Pub. Date: Dec. 12, 2013

(65) Prior Publication Data
US 2015/0122546 A1    May 7, 2015

(30) Foreign Application Priority Data

Jun. 8, 2012   (FR) ..................... 12 55352

(51) Int. Cl.
*H02G 15/184* (2006.01)
*H02G 15/107* (2006.01)
*H02G 15/068* (2006.01)

(52) U.S. Cl.
CPC ......... *H02G 15/184* (2013.01); *H02G 15/068* (2013.01); *H02G 15/107* (2013.01)

(58) Field of Classification Search
CPC ..... H01B 9/027; H02G 15/076; H02G 15/184
(Continued)

(56) References Cited

U.S. PATENT DOCUMENTS 3,748,369 A * 7/1973 Durakis ................. H01B 13/26
156/56
3,935,042 A * 1/1976 Wahl ..................... H01B 9/027
156/56
(Continued)

FOREIGN PATENT DOCUMENTS

| EP | 1280167 | 1/2003 |
| FR | 1077452 | 11/1954 |
| WO | 2010149229 | 12/2010 |

OTHER PUBLICATIONS

International Search Report dated 2013.

*Primary Examiner* — Chau N Nguyen
(74) *Attorney, Agent, or Firm* — Sofer & Haroun, LLP

(57) ABSTRACT

The present invention relates to a device comprising at least one electrical cable (10a, 10b, and 10c) for transporting DC current, said electrical cable comprising an elongate electrical conductor (11a, 11b, and 11c) surrounded by at least one first semiconducting layer (12c), an electrically insulating layer (13a, 13b and 13c) surrounding the first semiconducting layer and a second semiconducting layer (14a, 14b and 14c) surrounding the electrically insulating layer, characterized in that the electrical cable (10a, 10b, and 10c) furthermore comprises a space charge trapping layer (15a, 15b, and 15c) obtained on the basis of a polymeric composition comprising at least one organic polymer and at least one linear filler, the space charge trapping layer (15a, 15b, and 15c) replacing at least in part the second semiconducting layer (14a, 14b, and 14c) of the electrical cable, so that the space charge trapping layer is in physical contact with the electrically insulating layer (13a, 13b, and 13c) of the electrical cable.

27 Claims, 2 Drawing Sheets

(58) Field of Classification Search
USPC .......................................... 174/120 SC, 73.1
See application file for complete search history.

(56) References Cited

U.S. PATENT DOCUMENTS

| | | | | |
|---|---|---|---|---|
| 4,079,189 | A | * | 3/1978 | Troccoli .............. H02G 15/184 174/73.1 |
| 4,487,994 | A | * | 12/1984 | Bahder .............. B29C 61/0616 156/49 |
| 4,621,169 | A | * | 11/1986 | Petinelli .................. H01B 1/22 166/241.3 |
| 4,822,952 | A | * | 4/1989 | Katz .................... H02G 15/064 156/49 |
| 5,365,020 | A | * | 11/1994 | Vallauri ................... H01R 4/70 174/73.1 |
| 5,502,279 | A | | 3/1996 | Mirebeau et al. |
| 5,821,459 | A | | 10/1998 | Cheenne-Astorino et al. |

* cited by examiner

DEVICE COMPRISING A SPACE CHARGE TRAPPING LAYER

RELATED APPLICATIONS

This application is a National Phase Application of PCT/FR2013/051328, filed on Jun. 7, 2013, which in turn claims the benefit of priority from French Patent Application No. 12 55352 filed on Jun. 8, 2012, the entirety of which are incorporated herein by reference.

BACKGROUND

Field of the Invention

The present invention relates to a device comprising an electrical cable and/or an electrical cable fitting, and a space charge trapping layer.

The present invention is typically but not exclusively applicable to the fields of power cables and their fittings, for the transmission of DC current.

Description of the Related Art

Power cables are typically medium-voltage (especially from 6 to 45-60 kV) or high-voltage (especially higher than 60 kV, and possibly ranging up to 800 kV) cables, especially for DC current (i.e. DC voltage) transmission.

Medium- or high-voltage power cables typically comprise an elongate central electrical conductor and, in succession and coaxially about this electrical conductor, a first semiconductor layer (or internal layer), an electrically insulating layer, and a second semiconductor layer (or external layer). These layers are based on one or more polymers and may or may not be cross-linked.

Examples of power cable fittings include power cable joints and terminations, these fittings conventionally comprising one or more semiconductor elements.

The discontinuity in the electrical properties between the semiconductor elements of said fittings, and the electrically insulating layer of this type of cable may lead to a local strengthening of the electric field due to accumulation of space charge or space charges under the action of an electric field.

This electric field localized at the interface between the fitting and the cable may thus lead the electrical cable and/or fitting in question to breakdown, and is therefore a considerable threat to the reliability of a power transmission network with the well-known economic consequences engendered by power outages.

OBJECTS AND SUMMARY

The aim of the present invention is to mitigate the drawbacks of prior-art techniques especially by providing a device comprising an electrical, cable intended to be associated with an electrical cable fitting, or comprising an electrical cable fitting intended to be associated with an electrical cable, allowing space charge to be trapped, and thus electrical breakdown at the interface between said cable and said accessory to be significantly limited or even prevented.

A first subject of the present invention is a device comprising at least one electrical cable comprising an elongate electrical conductor encircled by at least one first semiconductor layer, an electrically insulating layer encircling the first semiconductor layer, and a second semiconductor layer encircling the electrically insulating layer, characterized in that the electrical cable furthermore comprises a space charge trapping layer, said layer being obtained from a polymeric composition comprising at least one organic polymer and at least one linear filler, the space charge trapping layer replacing at least in part the second semiconductor layer of the electrical, cable, so that the space charge trapping layer makes physical contact with the electrically insulating layer of the electrical cable.

More particularly, when the electrical cable is associated with an electrical cable fitting, said fitting comprising at least one semiconductor element, the space charge trapping layer is especially intended to make physical contact at least partially with the semiconductor element of the fitting.

A second subject of the present invention is a device comprising an electrical cable fitting, said fitting comprising at least one semiconductor element and being intended to be associated with at least one electrical cable, said electrical cable comprising an elongate electrical conductor encircled by at least one first semiconductor layer, and an electrically insulating layer encircling the first semiconductor layer, and a second semiconductor layer encircling the electrically insulating layer, characterized in that the fitting furthermore comprises a space charge trapping layer, said layer being obtained from a polymeric composition comprising at least one organic polymer and at least one linear filler, the space charge trapping layer being intended to replace at least in part the second semiconductor layer of the electrical cable, so that the space charge trapping layer possibly makes physical contact with the electrically insulating layer of the electrical cable.

More particularly, the space charge trapping layer may make physical contact at least partially with the semiconductor element of the fitting.

A third subject of the present invention is a device comprising:
at least one electrical cable comprising an elongate electrical conductor encircled by at least a first semiconductor layer, an electrically insulating layer encircling; the first semiconductor layer, and a second semiconductor layer encircling the electrically insulating layer; and
an electrical cable fitting comprising at least one semiconductor element, said electrical cable being associated with said fitting,
characterized in that the device furthermore comprises a space charge trapping layer, positioned between the electrically insulating layer of the electrical cable and said semiconductor element of the fitting, the space charge trapping layer being obtained from a polymeric composition comprising at least one organic polymer and at least one linear filler.

Preferably, the space charge trapping layer replaces at least in part the second semiconductor layer of the electrical cable, so that the space charge trapping layer makes physical contact at least partially with the electrically insulating layer of the electrical cable, and/or physical contact at least partially with the semiconductor element of the fitting.

A fourth subject of the present invention is a device comprising at least one electrical, cable, said electrical cable comprising an elongate electrical conductor encircled, by at least one first semiconductor layer, an electrically insulating layer encircling the first semiconductor layer, and a second semiconductor layer encircling the electrically insulating layer, characterized in that the electrical cable furthermore comprises a space charge trapping layer encircling the electrically insulating layer, and being encircled by the second semiconductor layer, the space charge trapping layer being obtained from a polymeric composition comprising at least one organic polymer and at least one linear filler.

This space charge trapping layer preferably extends the entire length of the electrical, cable and is especially a layer extruded the length of the electrical cable.

More particularly, the space charge trapping layer may make physical contact with the electrically insulating layer and with the second semiconductor layer.

In one particular embodiment, when the electrical cable is associated with an electrical cable fitting, said fitting comprising at least one semiconductor element, the space charge trapping layer is intended to make physical contact with the semiconductor element of the fitting.

To do this, a person skilled in the art will possibly simply strip one portion of the electrical cable and, in particular, remove one portion of the second semiconductor layer in order to gain access to the space charge trapping layer.

The electrical cable that is the fourth subject of the invention may be used in the devices that form the first, second and/or third subject of the invention.

In one particular embodiment of the invention, the space charge trapping layer is intended to be positioned between the electrically insulating layer of the electrical cable and the semiconductor element of the electrical cable fitting with which the cable is associated in its operational configuration in other words, the electrically insulating layer of the electrical, cable does not make physical, contact with the semiconductor element(s) of the electrical cable fitting in the operational configuration of the device of the invention.

In the present invention, the space charge trapping layer prevents the electrically insulating layer of the electrical cable from making physical contact with said semiconductor element of the fitting.

Preferably, the space charge trapping layer prevents the electrically insulating layer of the electrical cable from making physical contact with all of those constituent semiconductor elements of the fitting which said electrically insulating layer would be liable to make physical contact with if the space charge trapping layer were not present.

The present invention advantageously makes it possible to limit significantly or even prevent the electrical breakdown that is liable to be initiated at the interface between the electrical cable and the fitting associated with said cable, especially when the electrical cable is used for the transmission of DC current.

The expression "space charge trapping layer" is understood to mean a layer comprising a large number of traps. In the present invention, these trans (as understood in the context of semiconductor materials) have an energy level located between the valence band and the conduction band. They allow electrical charge carriers present in the material to be trapped, and may typically be 0.4 eV below the conduction band.

The expression "linear filler" is understood to mean a filler the resistivity of which under DC voltage is substantially independent of the applied electric field.

The term "semiconductor" means a layer or element preferably having an electrical resistivity of at most 1000 $\Omega \cdot m$ (ohm-meter) at 20° C., and preferably an electrical resistivity of at least 0.5 $\Omega \cdot m$ at 20° C., measured according to standard IEC 60840.

The expression "electrically insulating" is understood to mean a layer or element the electrical conductivity of which may preferably be at most $1 \times 10^{-9}$ S/m (siemens per meter) at 25° C.

An element A and an element B are said to make "physical contact" when there is direct contact between the elements A and B, no intermediate element being inserted between said elements A and B.

When the electrical cable is said to be associated or intended to be associated with an electrical cable fitting, or the electrical cable fitting is said to be associated or intended to be associated with an electrical cable, this more particularly means that at least one of the ends of the electrical cable is associated or is intended to be associated with said fitting.

When the device comprises a plurality of electrical cables, each of said electrical cables comprises an end that is associated or that is intended to be associated with said fitting.

Preferably, the space charge trapping layer is not electrically connected to the highest electrical potential of the electrical cable, such as for example the electrical conductor of the electrical cable. Thus, it is particularly not intended to control the electric field.

The linear filler of the present invention may be a material advantageously having a dielectric constant $\in$ that is at least higher than that of the organic polymer(s), and preferably having a dielectric constant $\in$ that is at least two times higher than that of the organic polymer(s).

Specifically, the greater the difference between the value of the dielectric constant of the organic polymer and the value of the dielectric constant of the linear filler, the better the trapping of the space charge will be.

The dielectric constant $\in$ is defined relative to the dielectric constant of vacuum, and is determined conventionally by the method ASTM D 150.

According to the invention, the linear filler is preferably a filler that is not very or not at all hygroscopic, or in other words it may be a filler that absorbs (or indeed adsorbs) little or no moisture. The hygroscopic character of the linear filler may thus be minimal.

According to a first particular embodiment, the linear filler may comprise nanoparticles.

The presence of nanoparticies, by way of linear filler, advantageously allows effects of aggregation between the fillers themselves in the polymeric composition to be significantly limited or even prevented.

The term "nanoparticles" is understood to mean fillers at least one of the dimensions of which is nanoscale in size, and preferably at least one of the dimensions of which is at most 100 nm.

The linear filler may be a substantially nonspherical filler, such as could be observed with a scanning electron microscope, so as to have the largest possible specific surface area. By way of example, the linear filler may be carbon black, and preferably nonspherical carbon black (i.e. the carbon black referred to as "furnace" black). Carbon black especially has said various properties, namely it is not very hygroscopic, it may be nanoscale in size and it may be nonspherical.

According to a second particular embodiment, the organic polymer and the linear filler may form a functionalized organic polymer.

Said functionalized organic polymer, replacing the compound formed by the organic polymer and the linear filler, comprises a macromolecular chain and at least one functional group, so that the macromolecular chain of the polymer is used by way of organic polymer, and the functional group is used by way of linear filler.

Thus, the dielectric constant $\in$ of the functional group is at least higher than that of the macromolecular chain of the functionalized polymer, and preferably the dielectric constant $\in$ of the functional group is at least two times higher than that of the macromolecular chain of the functionalized polymer.

By way of example, the functionalized organic polymer, replacing the organic polymer and the linear may be a copolymer of ethylene and vinyl acetate (EVA), or a copolymer of ethylene and butyl acrylate (EBA). In EVA it is the vinyl acetate function that plays the role of linear filler, and in EPA it is the butyl acrylate function that plays the role of linear filler.

According to a third particular embodiment, the linear filler may comprise a polymer different from the organic polymer of the polymeric composition of the invention. The composition therefore comprises said organic polymer and another polymer by way of linear filler.

By way of example, the linear filler may be a hydrogenated nitrile butadiene rubber (FINER).

The first and second particular embodiments are particularly advantageous because they significantly limit, even prevent, the presence of ionic impurities in the space charge trapping layer. Thus, once the device is in its operational configuration, electrical breakdown problems are limited in an optimal fashion.

According to the invention, the space charge trapping layer may advantageously have an electrical resistivity of at least $10^{13}$ Ω·m at 20° C., and preferably of at least $10^{18}$ Ω·m at 20° C., measured according to standard IEC 60840.

The polymeric composition may comprise at most 1.0% by weight linear filler, preferably at most 2% by weight linear filler and particularly preferably at most 1% by weight linear filler.

The space charge trapping layer may for its part have the same polymeric nature as that of the electrically insulating layer of the cable, so as to make it possible to guarantee an optimal adhesion between the space charge trapping layer and the electrically insulating layer of the electrical cable.

The polymeric nature of the space charge trapping layer is more particularly defined by the organic polymer(s) that compose the polymeric composition allowing the space charge trapping layer to be obtained.

By way of example, the space charge trapping layer may be an (uncross-linked) thermoplastic, (cross-linked) thermosetting, or elastomer layer. It may also be polar or apolar.

Thus, its polymeric nature may advantageously be chosen depending on the polymeric nature of the electrically insulating layer of the electrical cable, namely: when the electrically insulating layer of the electrical cable is a thermoplastic layer, the space charge trapping layer is a thermoplastic layer; when it is a thermosetting layer, the space charge trapping layer is a thermosetting layer; and when it is an elastomer layer, the space charge trapping layer is an elastomer layer.

In the present invention, the organic polymer may preferably be a polyolefin of the homopolymer or copolymer olefin type.

Depending on the polymeric nature of the electrically insulating layer of the electrical cable, a polymer of ethylene (ethylene homo- or copolymer) or a polymer of propylene (propylene homo- or copolymer) will preferably be used.

By way of example of ethylene polymers, mention may be made of linear low-density polyethylene (LLDPE), low-density polyethylene (LDPE), medium-density polyethylene (MDPE), high-density polyethylene (HDPE), copolymers of ethylene and vinyl acetate (EVA), copolymers of ethylene and butyl acrylate (EBA), methyl acrylate (EMA) and ethyl acrylate (EEA), copolymers of ethylene and alpha-olefins, polyethylene butene (PEE), copolymers of ethylene and propylene (EPR), such as for example terpolymers of ethylene propylene diene (EPDM), and their blends.

The polymeric composition of the invention may comprise more than 50.0 parts by weight organic polymer for 100 parts by weight polymer (s) in the composition, preferably at least 70 parts by weight organic polymer for 100 parts by weight polymer (s) in said composition, and particularly preferably at least 90 parts by weight organic polymer for 100 parts by weight polymer(s) in said composition.

Particularly advantageously, the constituent polymer(s) of the polymeric composition are only one or more organic polymers, and preferably only one or more polyolefins.

The polymeric composition according to the invention may furthermore comprise at least one protection agent such as an antioxidant.

Other additives and/or other fillers well known to those skilled in the art may also be added to the polymeric composition of the invention, such as scorch retarders; agents facilitating processing such as lubricants or waxes; compatibilizers; and/or coupling agents.

The polymeric composition of the invention may be cross-linked using techniques well known to those skilled in she art. For example, the polymeric composition will possibly furthermore comprise a cross-linking agent such as a generator of free radicals, such as for example an organic peroxide.

When an organic peroxide is used an agent allowing the efficacy of said organic peroxide to be increased in the presence of said linear filler is preferably added to the polymeric composition. Such agents are well, known to those skilled in the art and it may for example be a question of triallyl cyanurate.

In one particular embodiment of the electrical cable of the invention, the first semiconductor layer, the electrically insulating layer and the second semiconductor layer form a trilayer insulation. In other words, the electrically insulating layer makes direct physical contact with the first semiconductor layer, and the second semiconductor layer makes direct physical contact with the electrically insulating layer.

The electrical cable of the invention may comprise other elements encircling the second semiconductor layer, these other elements being well, known to those skilled in the art.

The electrical cable fitting of the invention more particularly encircles at least one of said ends of said cable, said end being that which is associated or which is intended to be associated with said fitting.

When the device comprises a plurality of electrical cables according to the invention, each of said electrical cables comprises an end that is associated with or that is intended to be associated with said fitting. Thus, the electrical cable fitting especially encircles said end of each of said cables.

By way of example, the electrical cable fitting of the invention may be a joint or a termination, these two types of fitting being well known to those skilled in the art.

An electrical, cable joint allows two electrical cables to be connected together, the joint encircling these two electrical cables. More particularly, the end of each electrical cable intended to be connected is positioned inside said joint.

At said end of each electrical cable, from among the first semiconductor layer, the electrically insulating layer and the second semiconductor layer, the second semiconductor layer of the cable is at least partially stripped so that the electrically insulating layer that is at least partially positioned inside the joint is not covered by the second semiconductor layer of the cable.

The junction comprises one or more semiconductor elements that encircle the end of each electrical cable intended to be connected. This or these semiconductor elements are well known for controlling the geometry of the electric field, when the device is under voltage.

An electrical cable termination encircles an electrical cable. More particularly, the end of the electrical cable is positioned inside said termination.

At said end of the electrical cable, from among the first semiconductor layer, the electrically insulating layer and the second semiconductor layer, the second semiconductor layer of the cable is at least partially stripped so that the electrically insulating layer that is at least partially positioned inside the termination is not covered by the second semiconductor layer of the cable.

The termination comprises a semiconductor element that encircles the electrical cable. This semiconductor element is well known for controlling the geometry of the electric field, when the device is under voltage.

In one particular embodiment of the invention especially with reference to the first, second and/or third subjects of the invention, the space charge trapping layer encircles the electrically insulating layer of the electrical cable. It preferably takes the form of a layer wound at least partially around the electrically insulating layer of the electrical cable. This wound layer may have a portion covering the second semiconductor layer of the electrical cable, or a portion that is covered by the second semiconductor layer of the electrical cable.

In another particular embodiment of the invention, the space charge trapping layer may also be positioned on the fitting. It may be prepared on the internal mandrel of the molding apparatus used to mould the fitting. The fitting is then molded conventionally on the mandrel thus modified. Lastly the mandrel is removed.

According to the invention, the thickness of the space charge trapping layer making physical contact with the electrically insulating layer of the electrical cable may be substantially constant the length of the device. By way of example, it may have a thickness of at least 0.5 mm.

More particularly, when the trapping layer comprises one or more portions furthermore covering at least in part the second semiconductor layer of the cable, said portion may have a thickness lower than that of the space charge trapping layer making physical contact with the electrically insulating layer of the electrical cable.

BRIEF DESCRIPTION OF THE DRAWINGS

Other features and advantages of the present invention will become apparent in light of the following examples and with reference to the annotated figures, said examples and figures being given by way of completely nonlimiting illustration.

DETAILED DESCRIPTION

For the sake of clarity, the same elements have been designated by identical references. Likewise, only elements essential to the comprehension of the invention have been shown schematically and not to scale.

Figure 1:
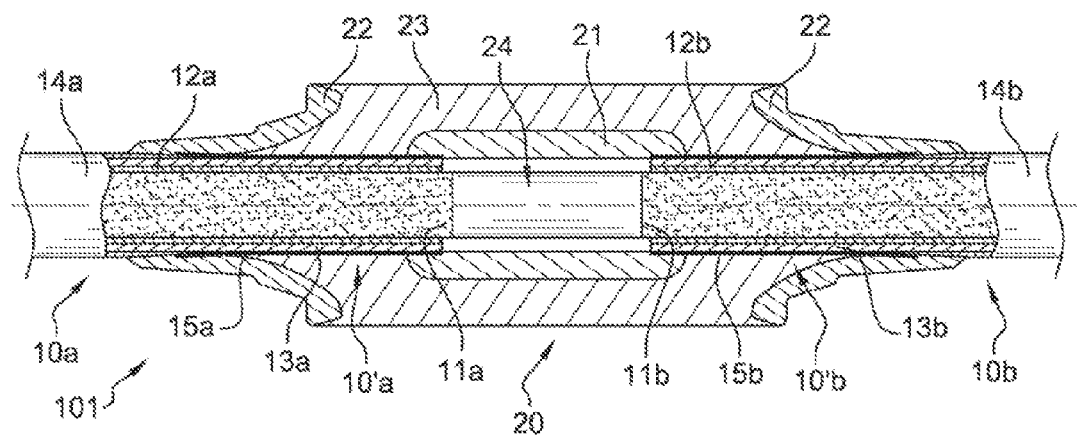
FIG. 1 shows a schematic view of a device according to the invention, comprising a joint in longitudinal cross section, this joint encircling the end of two electrical cables.

FIG. 1 shows a device 101 comprising:
a first electrical cable 10a comprising an electrical conductor ha encircled by a first semiconductor layer (not shown), an electrically insulating layer 13a encircling the first semiconductor layer, and a second semiconductor layer 14a encircling the electrically insulating layer; and
a second electrical cable 10b comprising an electrical conductor 11b encircled by at least one first semiconductor layer (not shown), an electrically insulating layer 13b encircling the first semiconductor layer, and a second semiconductor layer 14b encircling the electrically insulating layer.

This device 101 furthermore comprises a joint 20 encircling said electrical cables 10a and 10b. More particularly, the electrical cables 10a and 10b respectively comprise an end 10'a and 10'b intended to be encircled by the joint 20.

The body of the joint 20 comprises a first semiconductor element 21 and a second semiconductor element 22, which elements are separated by an electrically insulating element 23, said semiconductor elements 21, 22 and said electrically insulating element. 23 encircling the ends 10'a and 10'b of the electrical cables 10a and 10b.

This joint 20 allows the first cable 10a to be electrically connected to the second cable 10b, especially by virtue of an electrical connector 24.

At said end 10'a, 10'b of each electrical cable 10a, 10b, the second semiconductor layer 14a, 14b is at least partially stripped so that the electrically insulating layer 13a, 13b that is at least partially positioned inside the joint 20 is not covered by the second semiconductor layer 14a, 14b of the cable.

The end 10'a of the first electrical cable furthermore comprises a wound space charge trapping layer 15a (shown in longitudinal cross section in FIG. 1) according to the invention, replacing at least in part the second semiconductor layer 14a of the electrical cable, and encircling the electrically insulating layer 13a, so that the space charge trapping layer 15a makes physical contact with the electrically insulating layer 13a of the electrical cable, and makes physical contact with the semiconductor elements 21 and 22 of the joint 20. The space charge trapping layer 15a furthermore makes, physical contact with said electrically insulating layer 23 of the fitting.

The end 10'b of the second electrical cable furthermore comprises a space charge trapping layer 15b (shown in longitudinal, cross section in FIG. 1) according to the invention, replacing at least in part the second semiconductor layer 14b of the electrical cable, and encircling the electrically insulating layer 13b, so that the space charge trapping layer 15b makes physical contact with the electrically insulating layer 13b of the electrical cable, and makes physical contact with the semiconductor elements 21 and 22 of the joint 20. The space charge trapping layer 15b furthermore makes physical contact with said electrically insulating element 23 of the fitting.

The layers 15a, 15b furthermore cover at least in part the second semiconductor layer 14a, 14b.

Figure 2A:
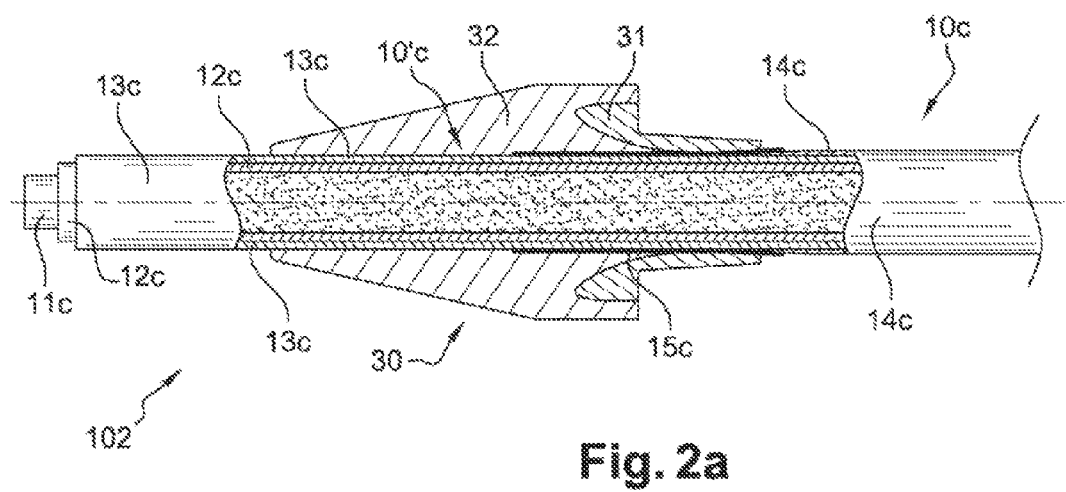
FIG. 2a shows a schematic view of a device according to a first variant of the invention, comprising a termination in longitudinal cross section, this termination encircling the end of a single electrical cable.

FIG. 2a shows a device 102 comprising a single electrical cable 10c comprising an electrical conductor 11c encircled by a first semiconductor layer 12c, an electrically insulating layer 13c encircling the first semiconductor layer, and a second semiconductor layer 14c encircling the electrically insulating layer.

This device 102 furthermore comprises a termination encircling said electrical cable 10c. More particularly, the electrical cable 10c comprises an end 10'c intended to be encircled by the termination 30.

The body of the termination 30 comprises a semiconductor element 31 and an electrically insulating element 32, said semiconductor element 31 and said electrically insulating element 32 encircling the end 10'c of the electrical cable 10c.

At said end 10'c of the electrical cable 10c, the second semiconductor layer 14c is at least partially stripped so that the electrically insulating layer 13c that is at least partially positioned inside the termination 30 is not covered by the second semiconductor layer 14c of the cable.

The end 10'c of the electrical cable furthermore comprises a wound space charge trapping layer 15c (shown in longitudinal cross section in FIG. 2) according to the invention, replacing at least in part the second semiconductor layer 14c of the electrical cable, and encircling the electrically insulating layer 13c, so that the space charge trapping layer 15c makes physical contact with the electrically insulating layer 13c of the electrical cable, and makes physical contact with the semiconductor element 31 of the termination 30. The space charge trapping layer 15a furthermore makes physical contact with said electrically insulating element 32 and may extend beyond the electrically insulating element 32.

The layer 15c furthermore covers at least in part the second semiconductor layer 14c.

Figure 2B:
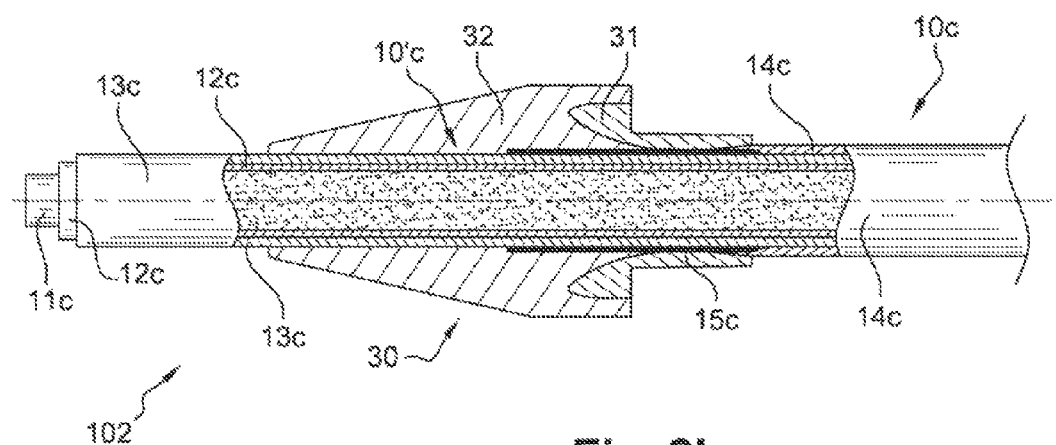
FIG. 2b shows a schematic view of a device according to a second variant of the invention, comprising a termination in longitudinal cross section, this termination encircling the end of a single electrical cable.

FIG. 2b shows a device 102 that is identical to that shown in FIG. 2a except that the position of the space charge trapping layer 15c is different. Specifically, the layer 15c does not cover the second semiconductor layer 14c, but is covered in part by the second semiconductor layer 14c. It is therefore positioned in part between the electrically insulating layer 13c and the second semiconductor layer 14c.

In FIGS. 1, 2a and 2b, the various space charge trapping layers 15a, 15b, 15c are respectively positioned between the electrically insulating layer 13a, 13b, 13c of the electrical cable and the semiconductor element 22, 31 of the electrical cable fitting with which the cable is associated.

Figure 3:
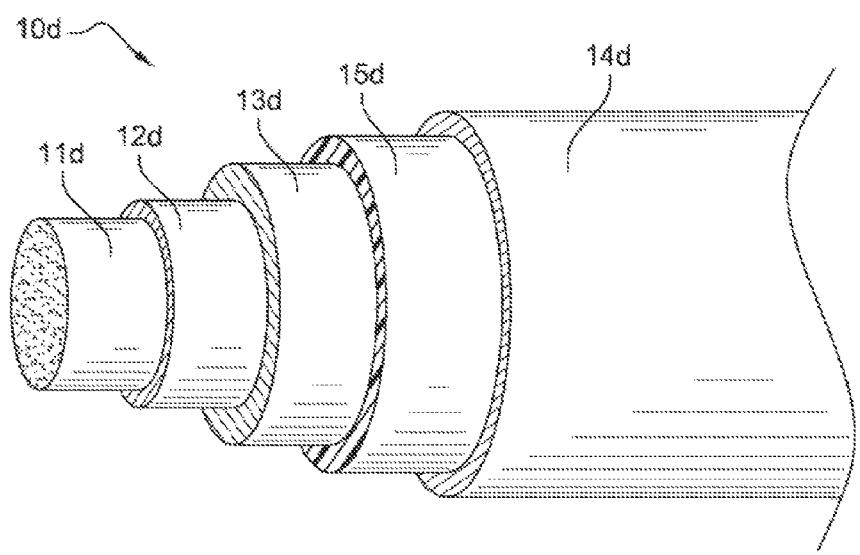
FIG. 3 shows a schematic view of a device according to the invention, comprising an electrical cable with a space charge trapping layer extending the entire length of said cable.

FIG. 3 shows a device comprising an electrical cable 10d. This electrical cable comprises an elongate central electrical conductor 11d encircled in succession and coaxially by a first semiconductor layer, an electrically insulating layer, a space charge trapping layer according to the invention consisting of a layer extruded the entire length of the cable, and a second semiconductor layer. The space charge trapping layer makes physical contact with the electrically insulating layer and she second semiconductor layer.

The four layers of this electrical cable are layers extruded using techniques well known to those skilled in the art.

By way of example, if the electrically insulating layer of the electrical cables 10a, 10b, 10c and 10d is a cross-linked polymeric layer based on a low-density polyethylene, the space charge trapping layers 15a, 15b, 15c and 15d are obtained from a polymeric composition comprising:

- 97% by weight organic polymer, namely the low-density ethylene polymer (LDPE) sold by INEOS under reference BPD 2000 having a dielectric constant $\in$ equal to 2.3;
- 1% by weight linear filler, namely the nonspherical carbon black sold by CABOT under reference VULCAN XC 72 having a dielectric constant $\in$ equal to $10^5$);
- 1% by weight organic peroxide;
- 0.8% by weight triallyl cyanurate; and
- 0.2% by weight antioxidant.

For the devices in FIGS. 1, 2a and 2b, a 1 mm thick strip of this polymeric composition is extruded using techniques well known to those skilled in the art. Once at least one of the ends of the electrical cable that is intended to be associated with the fitting has been stripped (cf. the second semiconductor layer is partially stripped in order to access the electrically insulating layer), the strip is wound around the electrically insulating layer of the electrical cable so that the electrically insulating layer of the electrical cable cannot make physical contact with the semiconductor element(s) of the fitting in which the end of the electrical cable is intended to be positioned. It is then thermally cross-linked using techniques well known to those skilled in the art. The end of the electrical cable thus formed is positioned inside the fitting in question.

For the device in FIG. 3, this polymeric composition is extruded, with a thickness of about 1 mm, around the electrically insulating layer, in order to form a space charge trapping layer the entire length of the electrical cable. The second semiconductor layer of the cable is then extruded around this space charge trapping layer. The space charge trapping layer may be thermally cross-linked before or after the second semiconductor layer has been extruded, using techniques well known to those skilled in the art. In a variant embodiment, at least two of the four constituent layers of the electrical cable may be coextruded around the electrical conductor of the electrical cable.

The second semiconductor layer and the space charge trapping layer are respectively partially stripped at one of the ends of the electrical cable, in order to allow said electrical, cable to be positioned inside the fitting in question.

The invention claimed is:

1. A device comprising:
    at least one electrical cable for the transmission of DC current, said electrical cable having
        an elongate electrical conductor encircled by at least one first semiconductor layer,
        an electrically insulating layer encircling the first semiconductor layer, and
        a second semiconductor layer encircling the electrically insulating layer,
    wherein the electrical cable furthermore has a space charge trapping layer, said space charge trapping layer being obtained from a polymeric composition having at least one organic polymer and at least one linear filler, the resistivity of said space charge trapping layer under DC voltage is substantially independent of the applied electric field, and said space charge trapping layer having a resistivity of at least $10^{13}\,\Omega\cdot m$ at 20° C.,
    the space charge trapping layer replacing at least in part the second semiconductor layer of the electrical cable, so that the space charge trapping layer makes physical contact with the electrically insulating layer of the electrical cable, so that the electrically insulating layer has a portion wherein the second semiconductor layer and the space charge trapping layer are directly in physical contact with said electrically insulating layer.

2. The device as claimed in claim 1, wherein when the electrical cable is associated with an electrical cable fitting, said fitting has at least one semiconductor element, the space charge trapping layer is intended to make physical contact at least partially with the semiconductor element of the fitting.

3. The device as claimed in claim 2, wherein the fitting for an electrical cable encircles one end of said cable.

4. The device as claimed in claim 2, wherein the fitting for an electrical cable is a joint or a termination.

5. The device as claimed in claim 1, wherein the space charge trapping layer is intended to be positioned between the electrically insulating layer of the electrical cable and the semiconductor element of the electrical cable fitting.

6. The device as claimed in claim 1, wherein the linear filler is a material having a dielectric constant c that is at least higher than that of the organic polymer(s) of the polymeric composition.

7. The device as claimed in claim 1, wherein the linear filler is a material having a dielectric constant c that is at least two times higher than that of the organic polymer(s) of the polymeric composition.

8. The device as claimed in claim 1, wherein the linear filler is either one of substantially not or not hygroscopic.

9. The device as claimed in claim 1, wherein the linear filler comprises nanoparticles.

10. Device as claimed in claim 9, wherein the linear filler is carbon black.

11. The device as claimed in claim 1, wherein the linear filler comprises a polymer different from the organic polymer.

12. The device as claimed in claim 1, wherein the organic polymer and the linear filler form a functionalized organic polymer.

13. The device as claimed in claim 1, wherein the polymeric composition has at most 10% by weight linear filler.

14. The device as claimed in claim 1, wherein the space charge trapping layer has the same polymeric nature as that of the electrically insulating layer of the cable.

15. The device as claimed in claim 1, wherein the space charge trapping layer has a thickness of at least 0.5 mm.

16. The device as claimed in claim 1, wherein the space charge trapping layer has a resistivity of at least $10^{18}$ Ω·m at 20° C.

17. The device as claimed in claim 1, wherein said second semiconductor layer and said space charge trapping layer are directly in physical contact.

18. The device as claimed in claim 1, wherein the space charge trapping layer comprises traps with an energy level located between the valence band and the conduction band.

19. The device as claimed in claim 18, wherein the energy level of the space charge trapping layer is 0.4 eV below the conduction band.

20. A device comprising:
a fitting for an electrical cable for the transmission of DC current, said fitting having
at least one semiconductor element and being intended to be associated with at least one electrical cable, said electrical cable having
an electrical conductor encircled by at least one first semiconductor layer, and
an electrically insulating layer encircling the first semiconductor layer, and a second semiconductor layer encircling the electrically insulating layer,
wherein the fitting furthermore has a space charge trapping layer, said space charge trapping layer being obtained from a polymeric composition having at least one organic polymer and at least one linear filler, the resistivity of said space charge trapping layer under DC voltage is substantially independent of the applied electric field, and said space charge trapping layer having a resistivity of at least $10^{13}$Ω·m at 20° C.,
the space charge trapping layer being intended to replace at least in part the second semiconductor layer of the electrical cable, so that the space charge trapping layer possibly makes physical contact with the electrically insulating layer of the electrical cable, so that the electrically insulating layer has a portion wherein the second semiconductor layer and the space charge trapping layer are directly in physical contact with said electrically insulating layer.

21. The device as claimed in claim 20, wherein the space charge trapping layer makes physical contact at least partially with the semiconductor element of the fitting.

22. The device as claimed in claim 20, wherein the space charge trapping layer has a resistivity of at least $10^{18}$ Ω·m at 20° C.

23. A device comprising:
at least one electrical cable for the transmission of DC current, said electrical cable having
an elongate electrical conductor encircled by at least a first semiconductor layer,
an electrically insulating layer encircling the first semiconductor layer, and
a second semiconductor layer encircling the electrically insulating layer,
wherein the electrical cable furthermore has a space charge trapping layer encircling the electrically insulating layer, and being encircled by the second semiconductor layer, the space charge trapping layer being obtained from a polymeric composition comprising at least one organic polymer and at least one linear filler, the resistivity of said space charge trapping layer under DC voltage is substantially independent of the applied electric field, and said space charge trapping layer having a resistivety of at least $10^{13}$ Ω·m at 20° C.

24. The device as claimed in claim 23, wherein the space charge trapping layer extends the entire length of the electrical cable.

25. The device as claimed in claim 23, wherein the space charge trapping layer makes physical contact with the electrically insulating layer and with the second semiconductor layer.

26. The device as claimed in claim 23, wherein when the electrical cable is associated with an electrical cable fitting, said fitting having at least one semiconductor element, the space charge trapping layer is intended to make physical contact at least partially with the semiconductor element of the fitting.

27. The device as claimed in claim 23, wherein said at least one linear filler, has a resistivety of at least $10^{18}$ Ω·m at 20° C.

* * * * *

UNITED STATES PATENT AND TRADEMARK OFFICE
CERTIFICATE OF CORRECTION

PATENT NO. : 9,748,758 B2
APPLICATION NO. : 14/401208
DATED : August 29, 2017
INVENTOR(S) : Jean-Maxime Saugrain and Pierre Mirebeau It is certified that error appears in the above-identified patent and that said Letters Patent is hereby corrected as shown below:

In the Claims

Column 2, Claim 6, Line 6: The letter "C" between the words "constant" and "that" should read "ε"

Column 2, Claim 7, Line 10: The letter "C" between the words "constant" and "that" should read "ε"

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*